Dec. 28, 1937. J. H. KARLSON 2,103,329
GUARD FOR PARING KNIVES
Filed Jan. 31, 1936
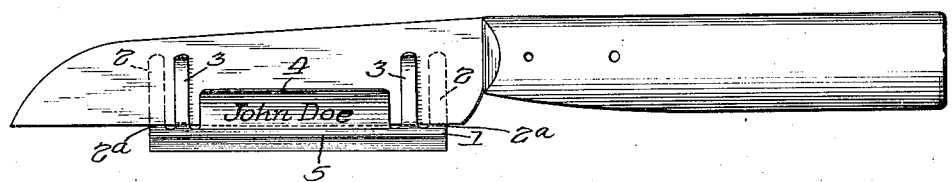
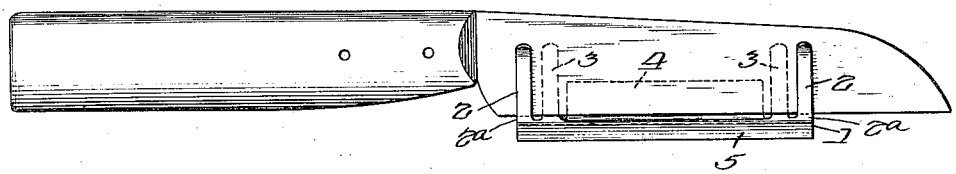
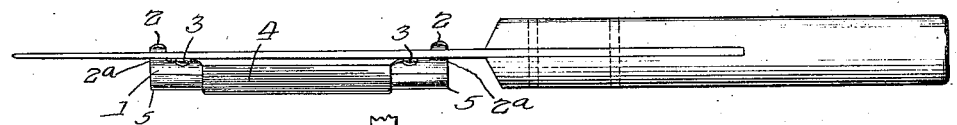
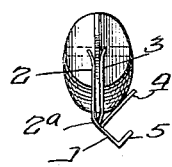 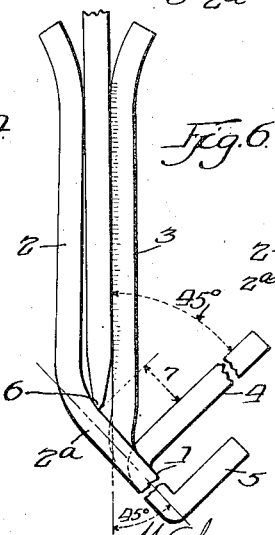 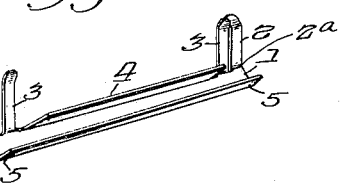
Inventor:
Julius H. Karlson
By Wilkinson, Huxley, Byron & Knight
Attys Patented Dec. 28, 1937

2,103,329

UNITED STATES PATENT OFFICE 2,103,329

GUARD FOR PARING KNIVES

Julius H. Karlson, Chicago, Ill.

Application January 31, 1936, Serial No. 61,687

2 Claims. (Cl. 30—285)

This invention relates to gauges for paring knives, and has for its object to provide a gauge that can be formed from a single thickness of sheet metal and one which, when applied to the paring knife, will provide a gauge bar suitably spaced from the knife edge to leave a throat for the peeling between them; to provide upon said gauge bar blade-embracing fingers that will fix the gauge bar at a desirable angle to the plane of the blade and also provide upon the gauge bar a guard flange that will provide a support for the peelings to continue substantially in the direction of their delivery for a substantial distance beyond the throat, said guard flange being located in a plane at such angle to the gauge bar as will stiffen the latter between its blade-embracing fingers; and to further provide upon the gauge bar a stiffening flange that extends substantially throughout the gauge bar and stiffens not only the main length of the bar but the end portions thereof from which the blade-embracing fingers rise.

The invention proceeds upon the principle of stamping from a single blank of sheet metal, a gauge bar having substantial width in the plane of the metal blank, with blade-embracing fingers upstanding therefrom in a plane which will hold the blade at about 135° from the plane of the gauge bar when positioned by said fingers; a guard flange projecting substantially perpendicularly to the plane of the gauge bar at the margin thereof from which project the blade-embracing fingers, said guard being at about 45° from the plane of the blade and spaced from the edge of the blade a distance to leave a substantial throat for the escape of peelings; and said gauge bar also having, upstanding from its edge remote from the said fingers and from the guard flange and preferably in a plane parallel with said guard flange, a flange which prevents incision by the remote edge of the gauge bar and which extends the full length of the gauge bar, therefore not only affording additional stiffening to that part of the gauge bar which is concurrent with the guard but lending rigidity to the end portions of the gauge bar from which the fingers rise, and therefore maintaining the latter in the same plane, to-wit: the plane in which the knife is to be supported.

In the accompanying drawing—

Figure 1 is a side view of a conventional form of paring knife having the gauge of the present invention applied thereto.

Figure 2 is a view of the opposite side of the parts shown in Figure 1.

Figure 3 is a top plan view of the parts shown in Figures 1 and 2.

Figure 4 is an end view of parts shown in Figures 1 to 3, inclusive.

Figure 5 is a detail perspective view of the gauge without the knife; and

Figure 6 is an end view on a greatly enlarged scale of the blade of the knife and the gauge applied thereto.

I represents the gauge bar upstanding from one edge of which are two pairs of fingers 2, 3, which are resilient in structure and adapted to assume positions on opposite sides of the blade of the knife which they are intended to embrace; these embracing fingers being on opposite sides of a plane which is at an angle of about 135° to the plane in which they support the gauge bar I when the gauge is on the knife.

As shown more clearly in Figure 6, the outer finger 2 of each bar, in its extension from the gauge bar I, extends in the plane of said gauge bar a distance to bring it past the edge of the inserted knife, whereupon the finger is deflected into a position parallel with the finger 3. The angular nature of the portion 2a through which finger 2 is connected with the gauge bar provides a stop for the blade of the knife which offers no impairment to the edge of the knife by reason of the angle of incidence at which the edge of the knife contacts it.

Also upstanding from the gauge bar I and from the same edge thereof from which the fingers 2, 3 arise, is a guard flange 4 terminating just short of the fingers and bent into a plane which is substantially perpendicular to the plane of the gauge bar I or at about 45° from the plane established by the fingers for the knife blade, and this guard 4 is spaced from the edge of the inserted knife a distance approximately indicated at 7 so that it leaves a very substantial throat through which the peelings may travel under the displacing influence of the peeling operation. Finally, the gauge bar I has upstanding from its edge that is remote from the fingers and from the guard 4, a second flange 5 preferably perpendicular to the plane of the gauge bar and extending the entire length of the gauge bar, although preferably of materially less depth than the guard 4. This second flange 5 converts the said remote edge of the gauge bar I into a deflecting surface that slides readily over the object being peeled without any tendency to incision; and this flange stiffens the end portions of the gauge bar I in a manner to keep the blade-embracing fingers in alignment on opposite sides of the plane in which it is desired that the knife be held.

Guard flange 4, in addition to forming a continuation of the throat, has a surface of such area as to afford advertising space in which may be stamped or otherwise inscribed a name or other data incident to advertisement.

By enlarging the proportions of the guard and thereby adapting it to a larger knife, it will serve as a gauge for slicing bread and other products as well as for paring fruit and the like.

I claim:

1. A guard for paring knives, comprising a flat metal gauge bar having integral with one edge thereof pairs of upstanding blade-embracing fingers deflected from said edge to opposite sides of a plane which causes them to hold a knife blade at a large obtuse angle to the plane of the gauge bar and to arrest the cutting edge of the blade at a throat-maintaining distance from the edge of said gauge bar from which said fingers project and in a plane laterally displaced therefrom; said gauge bar having a guard flange upstanding from the edge that carries the fingers and extending between the nearer fingers of the respective pairs in a plane substantially normal to the plane of said gauge bar; said gauge bar also having a stiffening flange upstanding from the margin thereof which is remote from its finger-carrying edge; and said stiffening flange extending beyond the said nearer fingers and at least over those portions of the gauge bar that carry the more remote fingers of the pairs.

2. A guard for paring knives, comprising a flat metal gauge bar having integral with one edge thereof upstanding blade-embracing fingers deflected from said edge to opposite sides of a plane which causes them to hold a knife blade at a large obtuse angle to the plane of the gauge bar and to arrest the cutting edge of the blade at a throat-maintaining distance from the edge of said gauge bar from which said fingers project and in a plane laterally displaced therefrom; said gauge bar having a guard flange upstanding from the edge that carries the fingers and extending between the nearer fingers of the respective pairs in a plane substantially normal to the plane of said gauge bar; said gauge bar also having a stiffening flange upstanding from the margin thereof which is remote from its finger-carrying edge.

JULIUS H. KARLSON.